(12) United States Patent
Hong

(10) Patent No.: US 6,231,021 B1
(45) Date of Patent: May 15, 2001

(54) FLAT PANEL DISPLAY APPARATUS EQUIPPED WITH A SUPPLEMENTAL STOPPER

(75) Inventor: You-sik Hong, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/210,611

(22) Filed: Dec. 14, 1998

(30) Foreign Application Priority Data

Dec. 12, 1997 (KR) .................................................. 97-36964

(51) Int. Cl.[7] .................................................. A47G 29/00
(52) U.S. Cl. ............................................ 248/371; 248/923
(58) Field of Search ...................... 248/917, 918, 248/919, 920, 921, 922, 923, 125.7, 130, 125.9, 133, 371, 370, 395, 398, 178.1, 179.1, 474, 479, 291.1, 292.12, 284.1; 361/681

(56) References Cited

U.S. PATENT DOCUMENTS

| | | | |
|---|---|---|---|
| 5,081,742 | * 1/1992 | Kobayashi | 16/337 |
| 5,335,142 | * 8/1994 | Anderson | 248/921 X |
| 5,520,361 | * 5/1996 | Lee | 248/398 |
| 5,652,694 | * 7/1997 | Martin | 361/681 |
| 5,687,939 | * 11/1997 | Moscovitch | 248/122.1 |
| 5,702,197 | * 12/1997 | Chen | 403/106 |
| 5,765,794 | * 6/1998 | Chen | 248/219.12 |
| 5,854,735 | * 12/1998 | Cheng | 361/681 |
| 5,941,497 | * 6/1998 | Inoue et al. | 248/291.1 X |
| 5,947,440 | * 9/1999 | Cho | 248/923 |
| 5,964,443 | * 10/1999 | Leveille | 248/478 |

* cited by examiner

Primary Examiner—Leslie A. Braun
Assistant Examiner—Tan Le
(74) Attorney, Agent, or Firm—Staas & Halsey LLP

(57) ABSTRACT

A flat-panel display apparatus including a display unit having a screen; a stand unit supporting the display uni; a hinge unit connected between the display unit and the stand unit, to enable forward and backward tilting and leftward and rightward swivelling of the display unit. A pair of tilt stoppers are formed in the hinge unit to prevent excessive tilting of the display unit either forwardly or rearwardly. A pair of supplemental stoppers is formed at external sides of the hinge member to reinforce the tilt stoppers to prevent the excessive tilting of the display unit.

17 Claims, 3 Drawing Sheets

FLAT PANEL DISPLAY APPARATUS
EQUIPPED WITH A SUPPLEMENTAL
STOPPER

CROSS-REFERENCE TO RELATED
APPLICATIONS

This application makes reference to, incorporates the same herein, and claims all benefits accruing under 35 U.S.C. §119 from my utility model application entitled Flat Panel Display Apparatus Compensating Hinge Unit for Tilt Operation filed with the Korean Industrial Property Office on Dec. 12, 1997 and there duly assigned Ser. No. 97-36964 by that Office.

BACKGROUND OF THE INVENTION

1. Field of the Invention

The present invention relates to a flat panel display apparatus having a screen, and more particularly, to a flat panel display apparatus which can stop a tilt operation of a flat panel display apparatus when an excessive force is provided to a display unit which includes a flat panel display screen for viewing images in order to control a visual angle of the display unit forwardly or backwardly. Movement of the display unit so as to tilt forwardly or backwardly, or swivel to the left or right is enabled by a hinge unit which is connected between the display unit and a stand unit which supports the display unit on a given surface.

2. Description of the Related Art

Generally, a flat panel display apparatus includes a hinge device for controlling a visual angle of a display unit in a left or right swivel direction (about an axis perpendicular to a surface on which the flat panel display apparatus rests), and forward or backward tilt direction (about an axis parallel to the surface on which the flat panel display apparatus rests). The hinge device is connected between the display unit, having a flat panel, and a stand unit performing the function of supporting the display unit.

The hinge device performs a tilting operation to control a visual angle by enabling movement of the display unit forward or backward, and enables a swivelling operation of the display unit to the left or right.

Also, the hinge device includes a pair of stoppers to be operated when the display unit is moved at least a certain predetermined angle from a standard position. There are two kinds of stoppers, one kind stops tilting and the other kind stops swivelling, and two of each kind are equipped inside the hinge device.

However, the stoppers are formed so as to have a small size due to the narrowness of the internal structure and equipment space, etc., of the hinge device, and therefore, they do not have that strong durability.

Also, the operations of tilting and swivelling of the display unit are accomplished by a manual activity of a user. However, sometimes an excessive force in the tilting direction is applied to the display unit when swivelling the display unit left or right, and the tilt stoppers, which are used to prevent excessive tilt of the display unit, receive the excessive force due to this. In this case, it is difficult to support the display unit in the tilt directions with just the stoppers inside of the hinge device.

That is, if the display unit is moved slowly during the tilting operation, no serious problem arises, but if the display unit is operated with an excessive force, the stoppers inside the hinge device receive the excessive force. As a result, some problems may arise, for example, an obstacle to movement of the display unit, deterioration in the reliance of the flat panel display device, and weakened representative competitive power may result.

SUMMARY OF THE INVENTION

Accordingly, it is an object of the present invention to provide a flat panel display apparatus having a hinge device that enables tilting of a flat panel display unit in a forward or backward direction, and swivelling in a right or left direction, and, which has a high degree of durability.

It is another object of the present invention to provide a flat panel display apparatus having a hinge device that enables tilting of a flat panel display unit in a forward or backward direction and swivelling in a right or left direction, has stoppers which stop the tilting operation of the flat panel display unit when a tilt angle exceeds a predetermined angle, and is capable of protecting the stoppers when an excessively large force is applied to the flat panel display unit in the tilt direction.

It is still a further object of the present invention to provide a flat panel display apparatus which has a great amount of durability by reinforcing stoppers which stops the tilting operation without any obstacle even though the display unit is tilted by an excessive force.

Additional objects and advantages of the invention will be set forth in part in the description which follows and, in part, will be obvious from the description, or may be learned by practice of the invention.

The foregoing and other objects of the present invention are achieved by providing a flat panel display device having a double stopper device in which supplemental stoppers are positioned outside of the hinge device in addition to stoppers positioned inside of the hinge device.

Therefore, the flat panel display apparatus of the present invention has stoppers mounted inside of the hinge device and supplemental stoppers mounted outside of the hinge device.

Also, the stoppers and supplemental stoppers perform a role that stops a rotation of tilt brackets of the hinge device for enabling tilting of the flat panel display unit, the tilt brackets being fixed to the lower part of the display unit.

Therefore, the flat panel display apparatus has a better reinforced hinge device because the tilting operation of the flat panel display unit is stopped by the supplemental stoppers in addition to the conventional stoppers.

Therefore, the above objects are further achieved by providing a flat panel display apparatus including a display unit having a screen; a stand unit supporting the display unit; a liquid crystal monitor having a hinge unit in which stoppers connected between the display unit and the stand unit are mounted, wherein the stoppers stop a tilting operation of the display unit; and supplemental stoppers formed outside of the hinge unit and which assist the operation of the stoppers.

One feature of the present invention is that the supplemental stoppers are mounted on both sides of the hinge main body of the hinge unit, and another feature of the present invention is that the supplemental stoppers are formed in accordance with the hinge main body.

Also, still another feature of the present invention is that a tilting operation of the display unit performed by the tilt brackets which are fixed to a lower part of the display unit, is stopped when the tilt brackets reach the supplemental stoppers.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
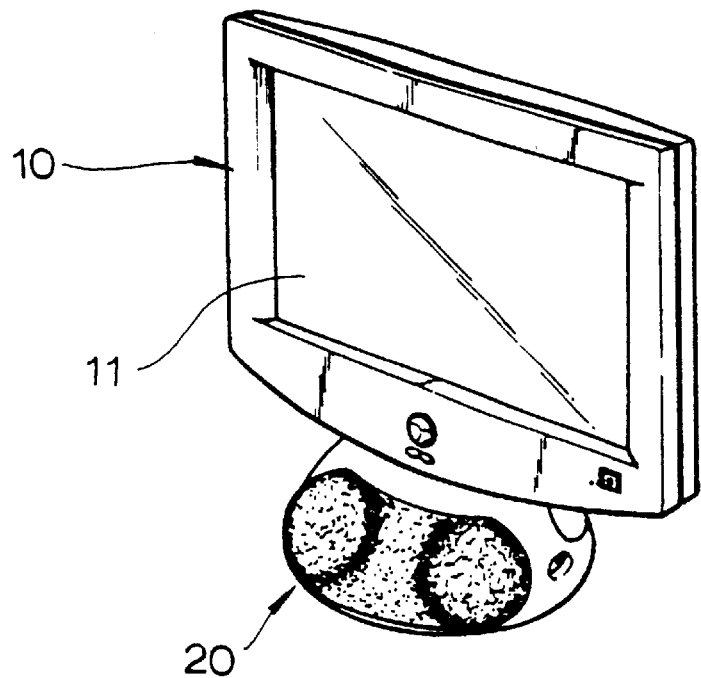
FIG. 1 is a perspective view of a flat panel display apparatus according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
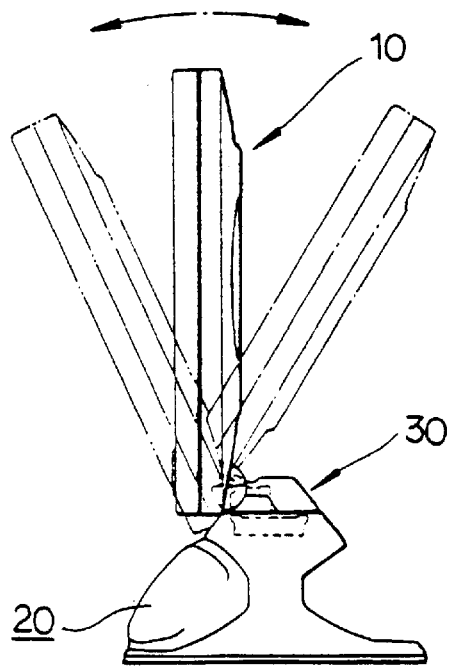
FIG. 2 is a side view of a flat panel display apparatus showing a tilting operation of a display unit shown in FIG. 1.

As shown in FIGS. 1 and 2, a flat panel display apparatus according to an embodiment of the present invention includes a display unit 10 having a liquid crystal display (screen) 11 displaying an image, a stand unit 20 supporting the display unit 10, a hinge unit 30 which connects the display unit 10 with the stand unit 20, and makes it possible to control the visual angle of the display unit 10 forwardly or backwardly (tilted about an axis extending along a bottom length of the display unit 10) or to the left or right (swivelling counterclockwise or clockwise about an axis extending perpendicular to the axis along the bottom length of the display unit 10).

Therefore, the angle of the display unit 10 is able to be controlled not only to the left or right (counterclockwise or clockwise rotation) but also forwardly or backwardly tilted by the hinge unit 30 as shown in FIG. 2.

Figure 3:
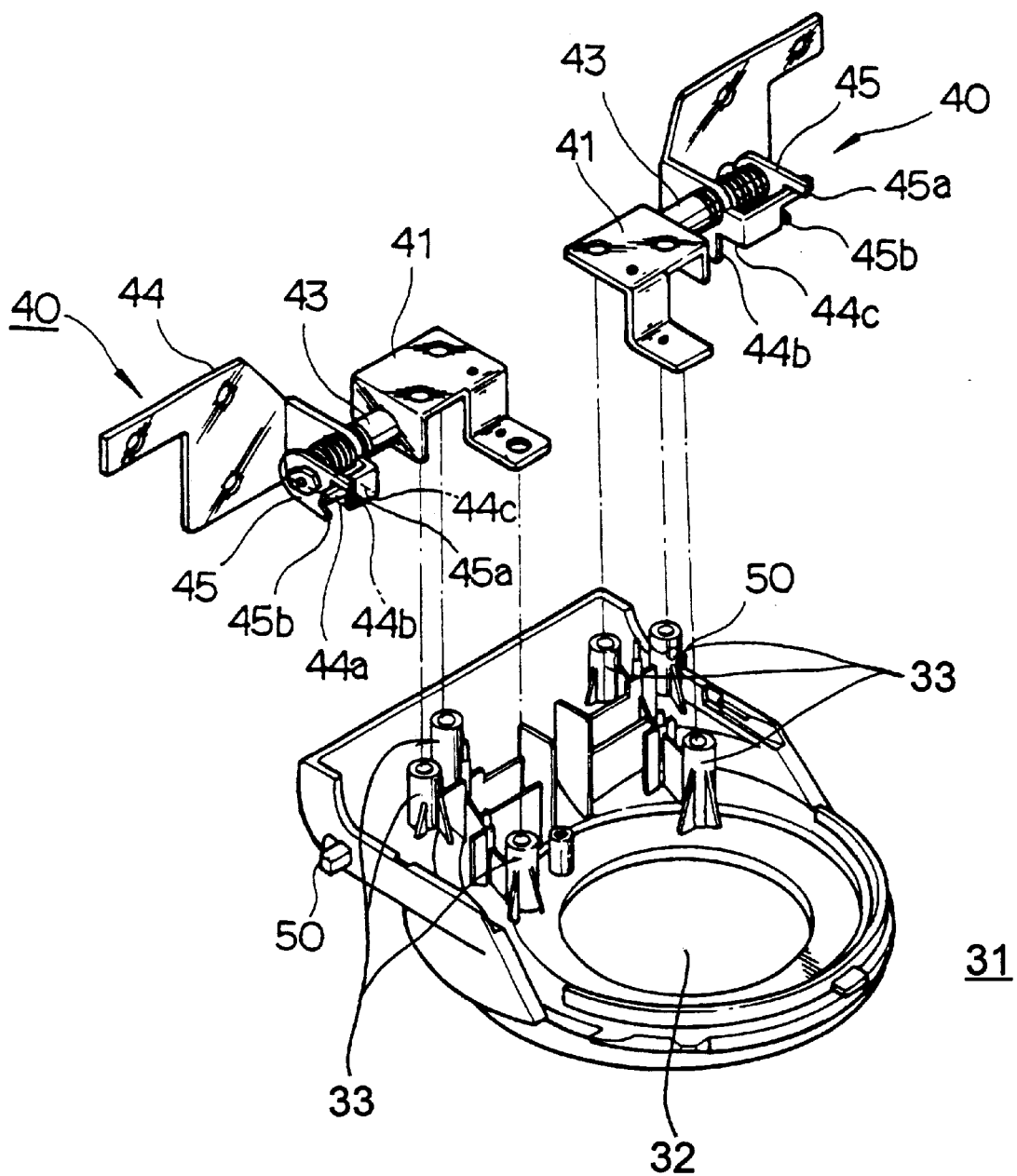
FIG. 3 is a disassembled perspective view of a hinge device which enables the tilting operation shown in FIG. 2 according to the embodiment of the present invention.
Figure 4:
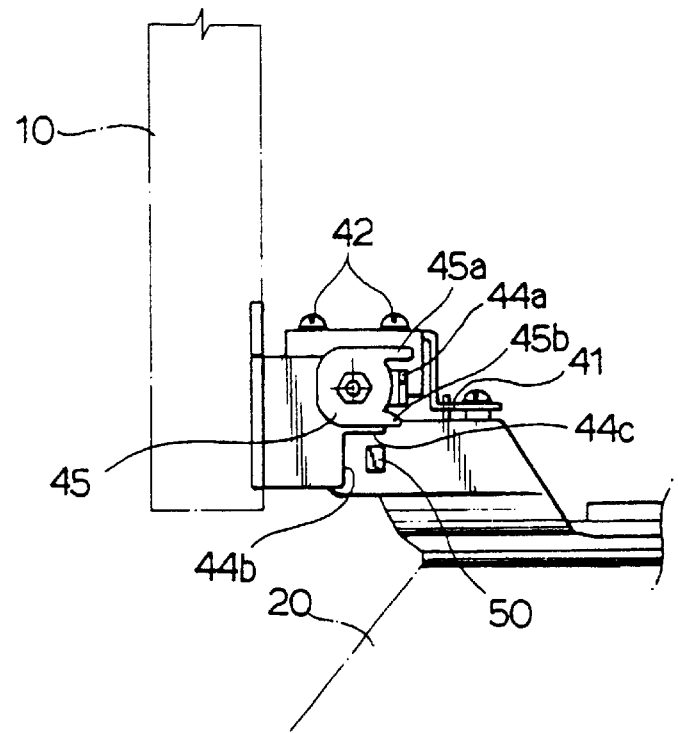
FIG. 4 is a side view of relevant parts of the flat panel display apparatus according to the embodiment of the present invention.

Referring to FIGS. 3 and 4, the hinge unit 30 includes a hinge main body 31 which is prevented from separating from the top of the stand unit 20 and an opening 32 is formed in the hinge main body 31. The opening 32 is engaged by a protrusion (not shown) of the stand unit 20 so as to enable the hinge main body 31 to swivel about an axis perpendicular to the surface on which the stand unit 20 rests in response to a force provided by a user on the display unit 10, thereby causing the display unit 10 to swivel about the same axis. The hinge main body 31 includes a plurality of fixing bosses 33 extending from an upper surface of the hinge main body 31.

Each of a pair of tilting apparatus units 40 has a hinge bracket 41 and a tilting bracket 44 which rotates around a tilting shaft 43 as a center of rotation at one side of the hinge bracket 41. The tilting bracket 44 has an engagement unit 44a, a lower tilting protruding end unit 44b and an upper tilting protruding end unit 44c. The lower tilting protruding end unit 44b is at a right angle to the upper tilting protruding end unit 44c. Each of the tilting brackets 44 is mounted to a lower part of the display unit 10 and moves in accordance with the display unit 10. The hinge brackets 41 are fixed to the hinge main body 31 by a plurality of screws 42 which pass through holes of the hinge brackets 41 and engage corresponding ones of the plurality of bosses 33.

A tilt stopper 45 is fixed to an outside end of a respective tilting shaft 43, and each tilt stopper 45 includes an upper stopper protruded end unit 45a and a lower stopper protruded end unit 45b. Each engagement unit 44a is always maintained between the lower stopper protruding end unit 45b and the upper stopper protruding end unit 45a of its respective tilt stopper 45.

The following description refers only to one of the tilting apparatus units 40, but applies equally to both. The engagement unit 44a of the tilting bracket 44 moves between the upper stopper protruded end unit 45a and the lower stopper protruded end unit 45b, and the tilting operation of rotating the tilting bracket 44 around the tilting shaft 43 as the center of rotation is stopped by the tilt stopper 45, thereby stopping tilting of the display unit 10 forwardly or backwardly.

The tilting apparatus units 40, except for the tilting brackets 44, are formed in the hinge unit 30, between the hinge unit main body 31 and a hinge cover (not shown).

Also, a pair of supplemental stoppers 50 is formed to protrude from respective sides of the hinge main body 31. The supplemental stoppers 50 are integrally formed to the hinge main body 31 which is molded by injection or the supplemental stoppers 50 are fixed separately to the hinge main body 31.

Each supplemental stopper 50 is formed to engage with the corresponding lower tilting protruded end unit 44b or the corresponding upper tilting protruded end unit 44c which are formed from a cut of the lower part of the tilting bracket 44.

The operation of the tilting mechanism of the present invention is described with reference to FIG. 4 and FIG. 5.

FIG. 4 shows one of the tilting apparatus units 40 in a state that the display unit 10 is vertical. The other tilting apparatus unit 40 is in the same state. Once again, the following description relates to only one of the tilting apparatus units 40 and a corresponding supplemental stopper 50, but applies to the other set as well. In this state, the engagement unit 44a of the tilting bracket 44 is in the middle between the upper stopper protruded end unit 45a and the lower stopper protruded end unit 45b.

Figure 5:
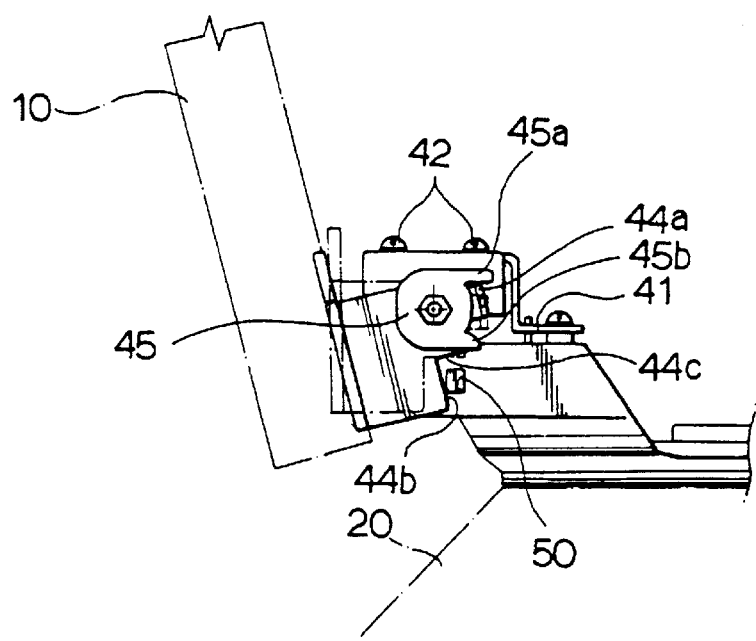
FIG. 5 is a side view showing an operation of the hinge device shown in FIG. 3 according to the embodiment of the present invention.

Accordingly, if a force is applied to the display unit 10 so as to incline forwardly (counterclockwise in FIG. 5) the liquid crystal display 11 of the display unit 10, the tilt bracket is rotated in the counterclockwise direction as well, shown in FIG. 5 since the tilting bracket moves in conjunction with the display unit 10.

When the display unit is tilted forwardly by a certain angle, the engagement unit 44a of the tilting bracket 44 engages the upper stopper protruded end unit 45a and the lower tilting protruded end unit 44b engages the supplemental stopper 50.

Conversely, if the display unit 10 is tilted backwardly by a certain angle (clockwise in FIG. 5), the tilting bracket 44 is rotated clockwise and the engagement unit 44a engages the lower stopper protruded end unit 45b, and the supplemental stopper 50 engages the upper tilting protruded end unit 44c of the tilting bracket 44 at the same time, and therefore the tilting operation of the display unit 10 including the tilting brackets 44 is stopped.

As a result, the tilting operation of the display unit 10 forwardly or backwardly is stopped by the stoppers 45 and the supplemental stoppers 50.

Therefore, the flat panel display device of the present invention has a more reinforced construction because the display unit is stopped not only by the tilt stoppers 45 but also by the supplemental stoppers 50.

Accordingly, a tilting operation is stopped with a reinforced construction by using supplemental stoppers 50 in addition to the tilt stoppers 45, even when tilting operation for controlling visual angle is done with an excessive force, and the tilt stoppers and the supplemental stoppers are free from any obstacles.

According to the description as set forth above, the present invention has an effect of providing a flat panel display apparatus with a greater reliance and free from obstacles, by reinforcing the stoppers which stop the tilting operation with supplemental stoppers, even when the display unit is tilted using an excessive force.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flat panel display apparatus comprising:
a display unit having a screen;
a stand unit supporting said display unit;
a hinge unit connected between said display unit and stand unit and enabling a tilting operation of said display unit, said hinge unit having a tilt stopper mechanism formed therein to stop the tilting operation of said display unit in response to said display unit tilting a predetermined angle, said hinge unit further comprising a tilting bracket fixed to a lower part of the display unit; and
a supplemental stopper mechanism formed outside of said hinge unit, to assist the stopping of the tilt operation by said tilt stopper mechanism, said supplemental stopper mechanism contacting said tilting bracket to stop the tilting operation in response to said display unit tilting the predetermined angle.

2. The apparatus as claimed in claim 1, wherein:
said hinge unit includes a hinge main body in which said tilt stopper mechanism is formed; and
said supplemental stopper mechanism includes a pair of supplemental stoppers respectively mounted on opposite sides of said hinge main body.

3. The apparatus as claimed in claim 1, wherein:
said hinge unit includes a hinge main body in which said tilt stopper mechanism is formed; and
said supplemental stopper mechanism is integrally formed with said hinge main body.

4. The apparatus as claimed in claim 1, wherein said tilting bracket has a lower tilting protruded end unit which contacts said supplemental stopper mechanism in response to said display unit tilting the predetermined angle in a first tilt direction and an upper protruded end unit which contacts said supplemental stopper mechanism in response to said display unit tilting another predetermined angle in a second tilt direction opposite the first tilt direction.

5. A flat panel display apparatus comprising:
a display unit having a screen;
a stand unit supporting said display unit;
a hinge unit connected between said display unit and stand unit and enabling a tilting operation of said display unit, said hinge unit comprising:
a hinge main body;
a tilt stopper mechanism formed in the hinge main body to stop the tilting operation of said display unit in response to said display unit tilting a predetermined angle, the tilt stopper mechanism comprising:
a pair of tilt apparatus units each including:
a tilting bracket fixed to a lower part of said display unit,
a hinge bracket fixed to said hinge main body and having an engagement unit, an upper tilting protruding end unit and a lower tilting protruding end unit which move in conjunction with said tilting bracket,
a tilting shaft fixedly connected to said hinge bracket and rotatably connected to said tilting bracket, and
a tilt stopper having an upper stopper protruding end unit and a lower stopper protruding end unit, wherein said engagement unit is between said upper stopper protruding end unit and said lower stopper protruding end unit to limit an amount of tilting of said tilting bracket and said display unit; and
a supplemental stopper mechanism formed outside of said hinge unit, to assist the stopping of the tilt operation by said tilt stopper mechanis, said supplemental stopper mechanism comprising a pair of stopper protrusions respectively between a corresponding pair of said upper tilting protruding end unit and said lower tilting protruding end unit, to limit the amount of tilting of said tilting bracket and said display unit.

6. The apparatus as claimed in claim 5, wherein said stopper protrusions are respectively formed at opposite sides of said hinge main body.

7. The apparatus as claim 6, wherein said pair of stopper protrusions are integrally formed on the opposite sides of said hinge main body.

8. The apparatus as claimed in claim 6, wherein:
each of said pair of hinge brackets has at least one hole;
said hinge main body has a plurality of bosses;
and the apparatus further comprises screws which pass through said at least one hole of each of said pair of hinge brackets and engage a corresponding one of the plurality of bosses.

9. A display apparatus for displaying information, the apparatus comprising:
a display unit having a screen to display the information;
a stand to support said display unit on a surface;
a hinge unit connecting said display unit to said stand, to enable said display unit to be tilted about an axis parallel to the surface, and having a stopper mechanism formed inside of said hinge unit to stop said display unit from tilting greater than a predetermined angle in a particular direction, the hinge unit comprising:
a hinge main body which is connected to said stand;
a tilting shaft connected to said hinge main body;
first and second stopper protrusions; and
a tilting bracket fixed to said display unit and rotatable about said tilting shaft, wherein said tilting bracket has an engagement protrusion and first and second tilting protrusions;
wherein said engagement protrusion is between said first and second stopper protrusions, and contacts one of said first and second stopper protrusions to prevent additional tilting of said display unit in response to said display unit tilting the predetermined angle in the particular direction or another direction opposite the particular direction by the predetermined angle; and a supplemental stopper mechanism formed outside of said hinge unit, to stop said display unit from tilting greater than the predetermined angle in the particular direction, said supplemental stopper mechanism comprising a stopper protrusion between said first and second tilting protrusions, and which contacts one of said first and second tilting protrusions to prevent the additional tilting of said display unit in response to said display unit tilting the predetermined angle in the particular direction or the another direction by the predetermined angle.

10. The display apparatus as claimed in claim 9, wherein said supplemental stopper protrusion is formed on an external surface of said hinge main body.

11. The display apparatus as claimed in claim 9, wherein said first and second tilting protrusions are substantially at right angles to each other.

12. The display apparatus as claimed in claim 11, wherein said first and second stopper protrusions are substantially parallel to each other.

13. The display apparatus as claimed in claim 9, wherein said first and second stopper protrusions are substantially parallel to each other.

14. The display apparatus as claimed in claim 9, wherein said hinge unit further comprises:

an another tilting shaft connected to said hinge main body;

other first and second stopper protrusions; and an another tilting bracket fixed to said display unit and rotatable about said another tilting shaft, wherein said another tilting bracket has an another engagement protrusion and other first and second tilting protrusions;

wherein said another engagement protrusion is between said other first and second stopper protrusions, and contacts one of said other first and second stopper protrusions to prevent the additional tilting of said display unit in response to said display unit tilting the predetermined angle in the particular direction or the another direction; and said supplemental stopper mechanism further comprises an another stopper protrusion between said other first and second tilting protrusions, and which contacts one of said other first and second tilting protrusions to prevent the additional tilting of said display unit in response to said display unit tilting the predetermined angle in the particular direction or the another direction by the predetermined angle.

15. The display apparatus as claimed in claim 14, wherein said supplemental stopper protrusion and said another supplemental stopper protrusion are formed on an external surface and at opposite sides of said hinge main body.

16. A display apparatus for displaying information, comprising:

a display unit having a screen to display the information;

a stand to support said display unit on a surface;

a hinge device connecting said display unit to said stand, to enable said display unit to be tilted about an axis parallel to the surface, said hinge device comprising:

a pair of tilting brackets fixed to said display unit, each having an engagement unit and first and second tilt protruding elements, and a hinge main body having a pair of tilting shafts about which said pair of tilting brackets are respectively rotatable and a pair of tilt stoppers formed within said hinge main body and a pair of supplemental stoppers formed external of said hinge main body;

wherein movement of each engagement unit is limited by first and second protrusions of a corresponding one of said tilt stoppers, and movement of each pair of first and second tilt protruding elements is limited by a corresponding one of said supplemental stoppers.

17. A display apparatus for displaying information, comprising:

a display unit having a screen to display the information;

a stand to support the display unit;

a hinge main body attached to the stand;

a hinge bracket fixed to the hinge main body;

a tilting bracket connected to the display unit, the tilting bracket and the hinge bracket comprising a hinge, the tilting bracket rotating with respect to the hinge bracket about an axis, to enable the display unit to be tilted about the axis;

a first stopper mechanism formed within the hinge, to stop the display unit from tilting greater than a predetermined angle in a particular direction; and a supplemental stopper affixed to the hinge main body and protruding in a direction corresponding to the axis, the supplemental stopper contacting the tilting bracket at the predetermined angle, to stop the display unit from tilting greater than the predetermined angle in the particular direction.

* * * * *

UNITED STATES PATENT AND TRADEMARK OFFICE
CERTIFICATE OF CORRECTION

PATENT NO. : 6,231,021 B1
DATED : May 15, 2001
INVENTOR(S) : You-sik Hong

It is certified that error appears in the above-identified patent and that said Letters Patent is hereby corrected as shown below:

<u>Title page,</u>
Item [57], ABSTRACT,
Line 2, after "display" change "uni;" to -- unit; --

<u>Column 6,</u>
Line 23, change "mechanis" to -- mechanism --

Signed and Sealed this

Eighth Day of January, 2002

Attest:

Attesting Officer

JAMES E. ROGAN
Director of the United States Patent and Trademark Office